Sept. 22, 1970   J. H. MAYHEW ET AL   3,529,714
CONVEYOR BELT AND MACHINE EMPLOYING SAME
Filed Oct. 6, 1967
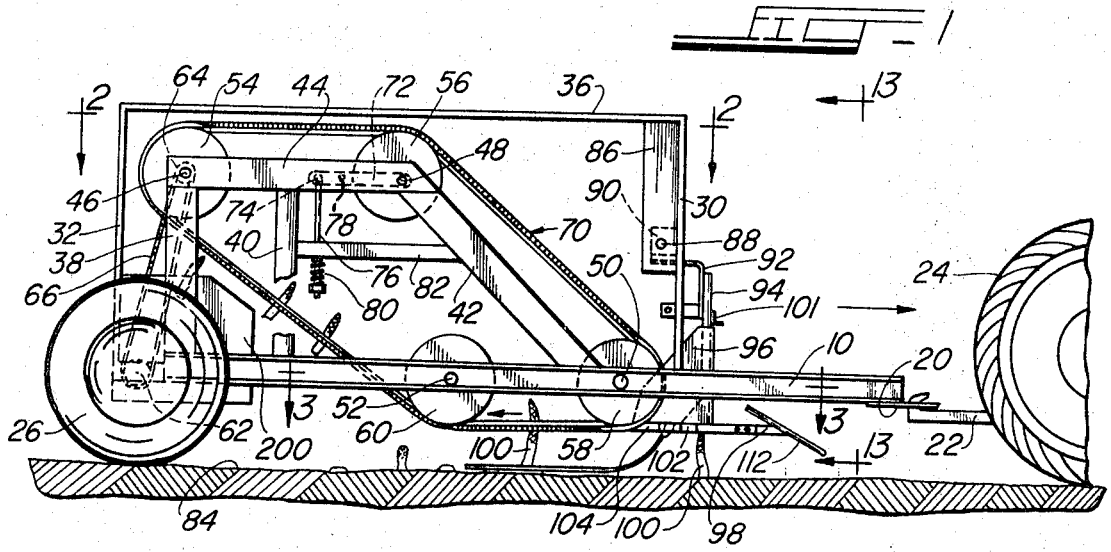
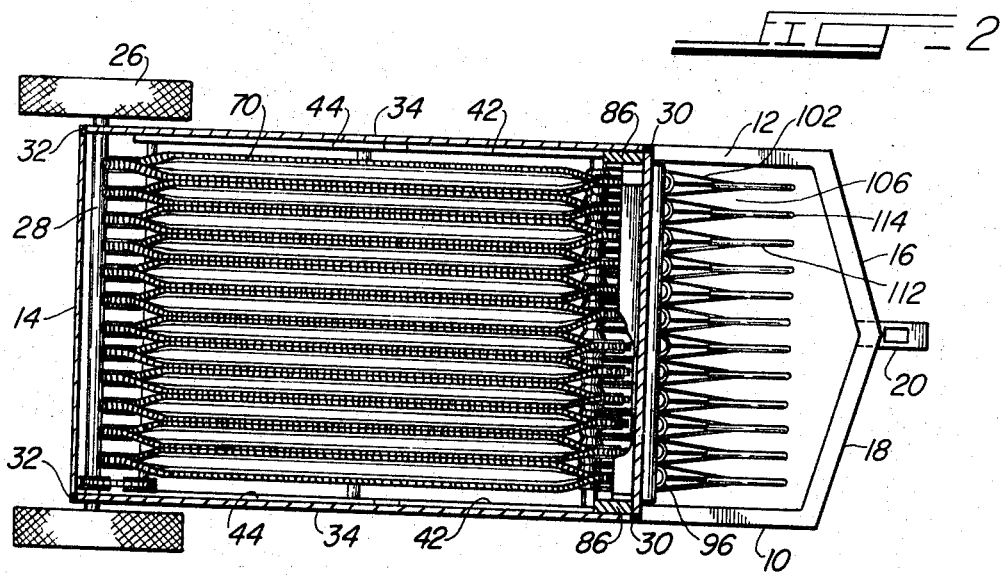
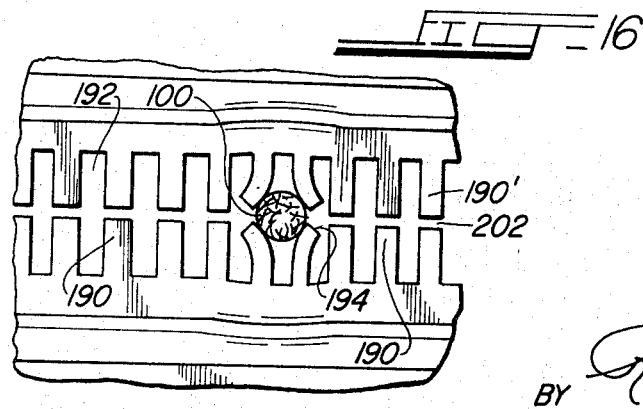
INVENTORS.
JOSEPH H. MAYHEW
JOHN O. CONVERSE
BY Rummler & Snow

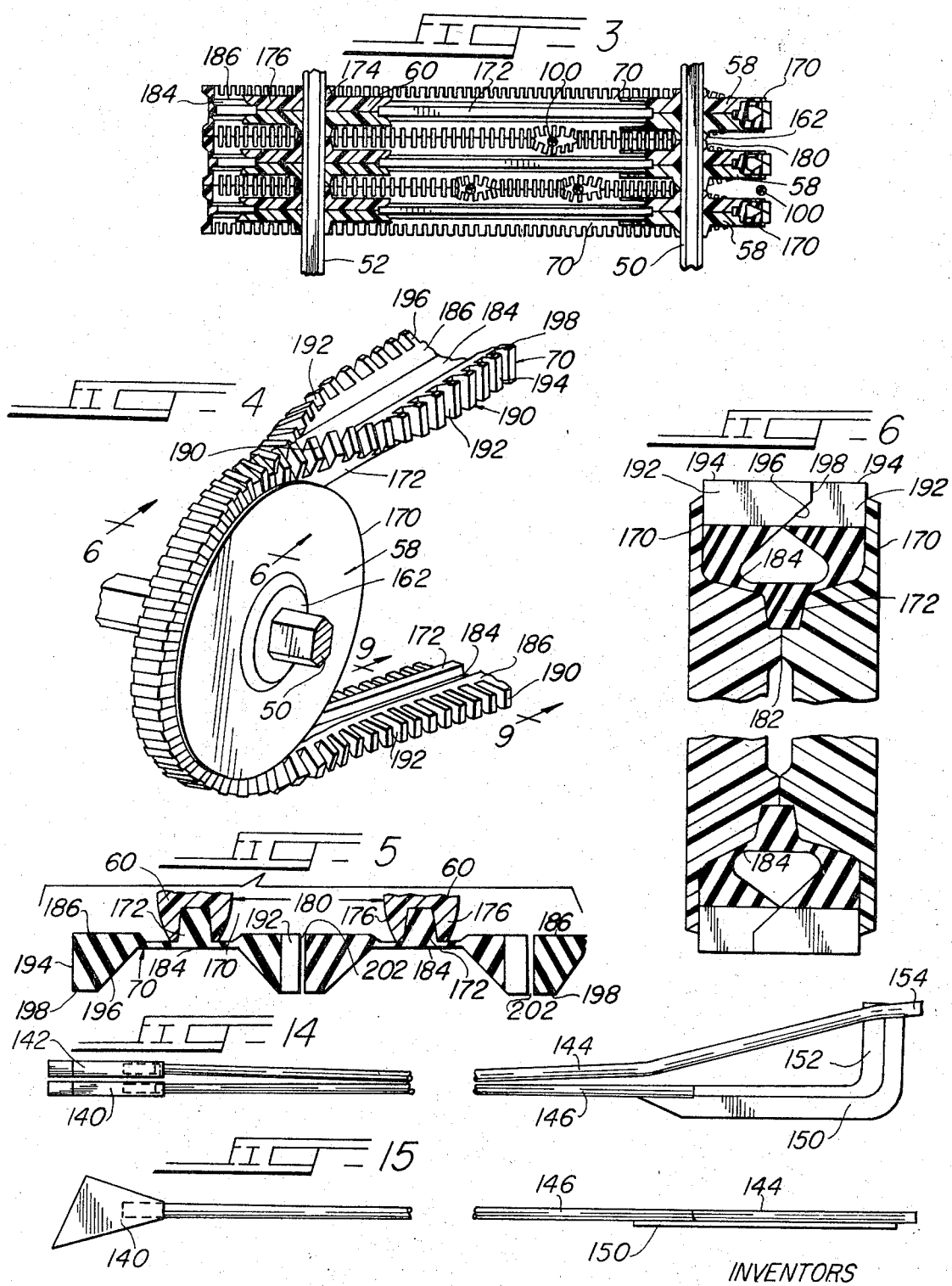

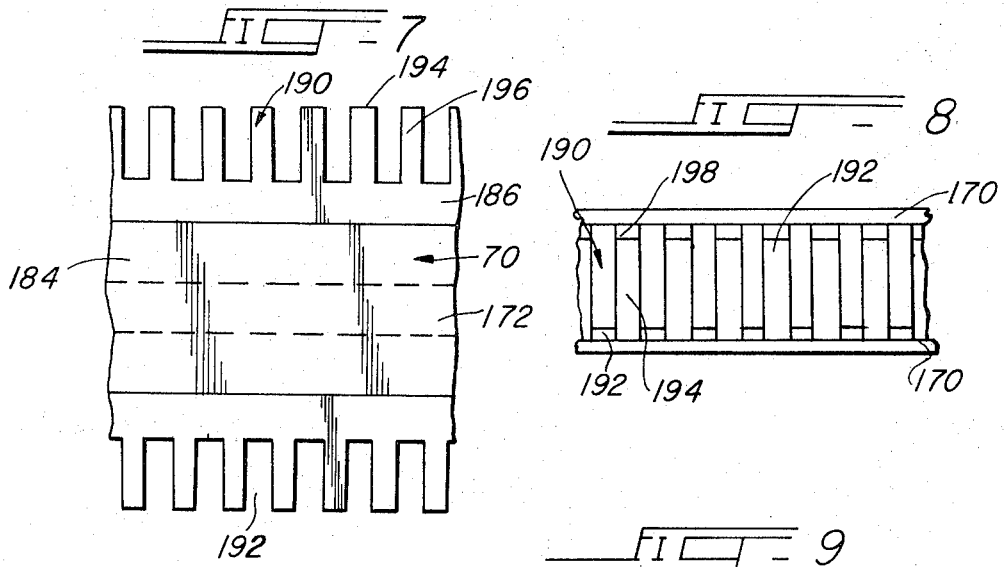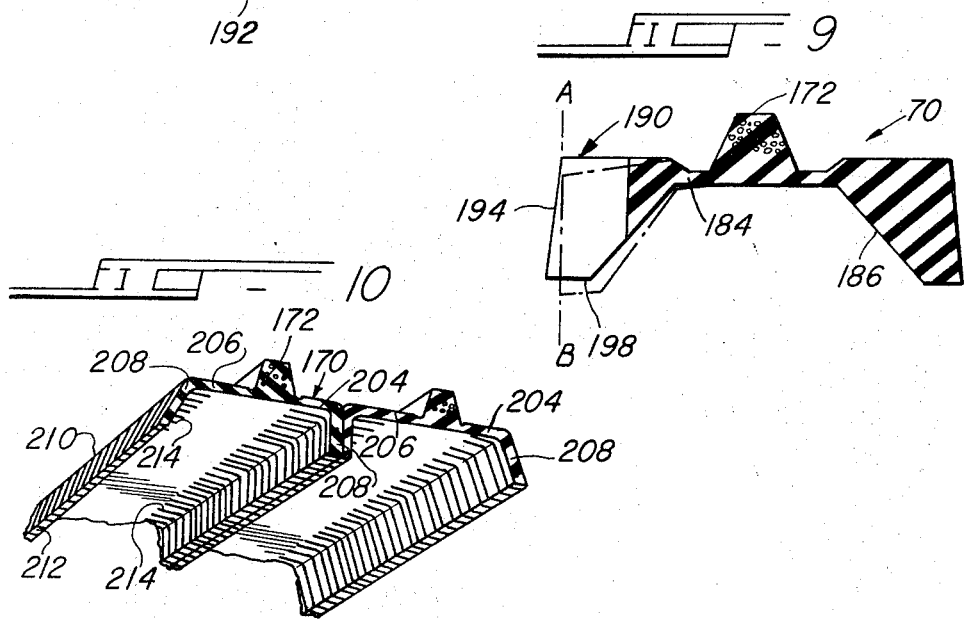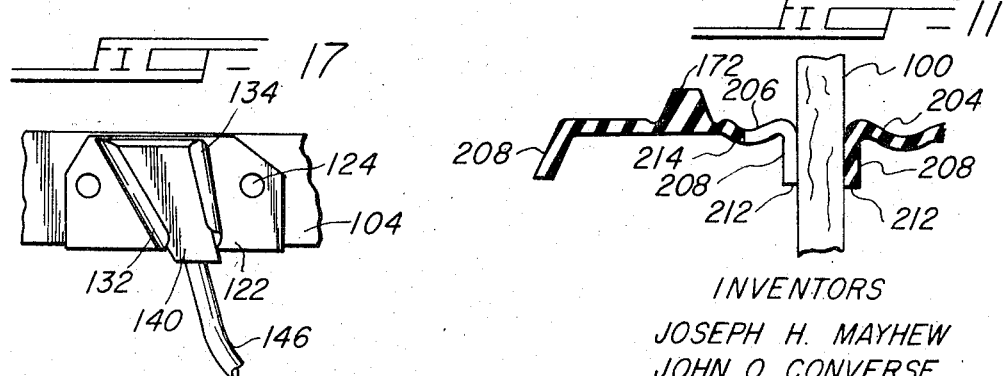

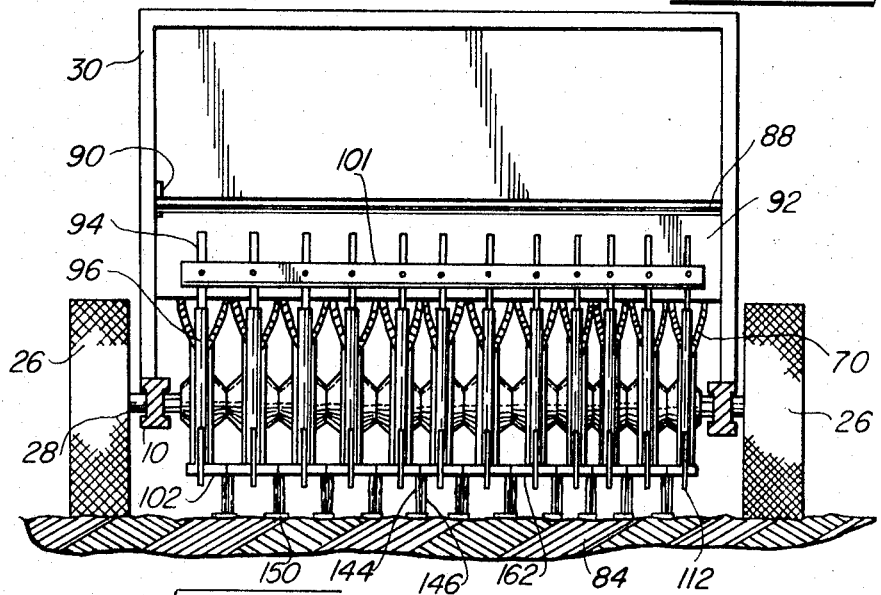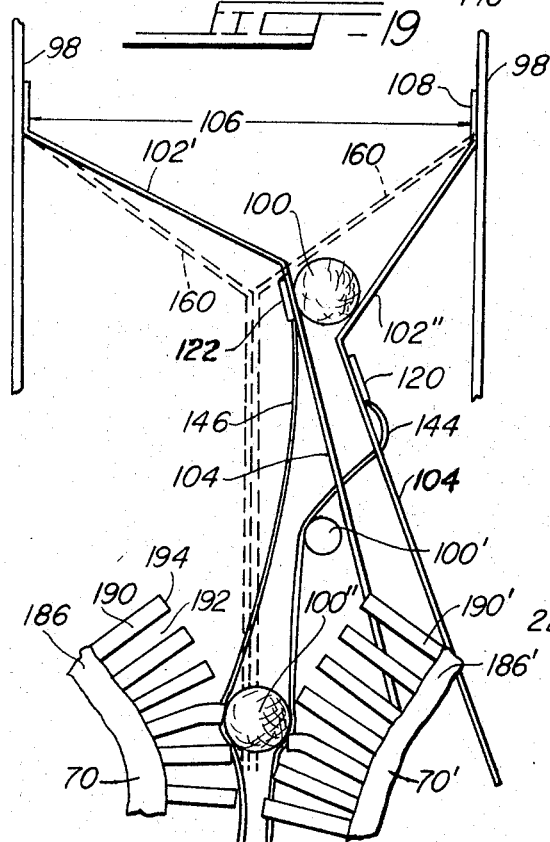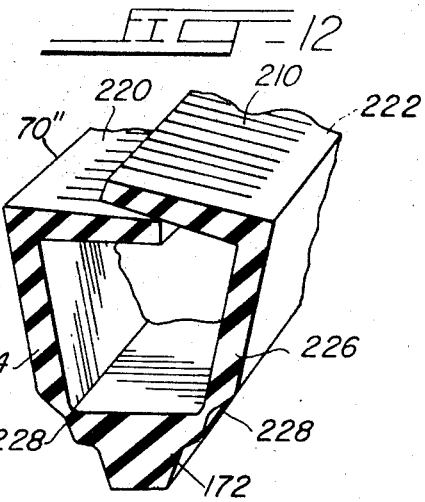

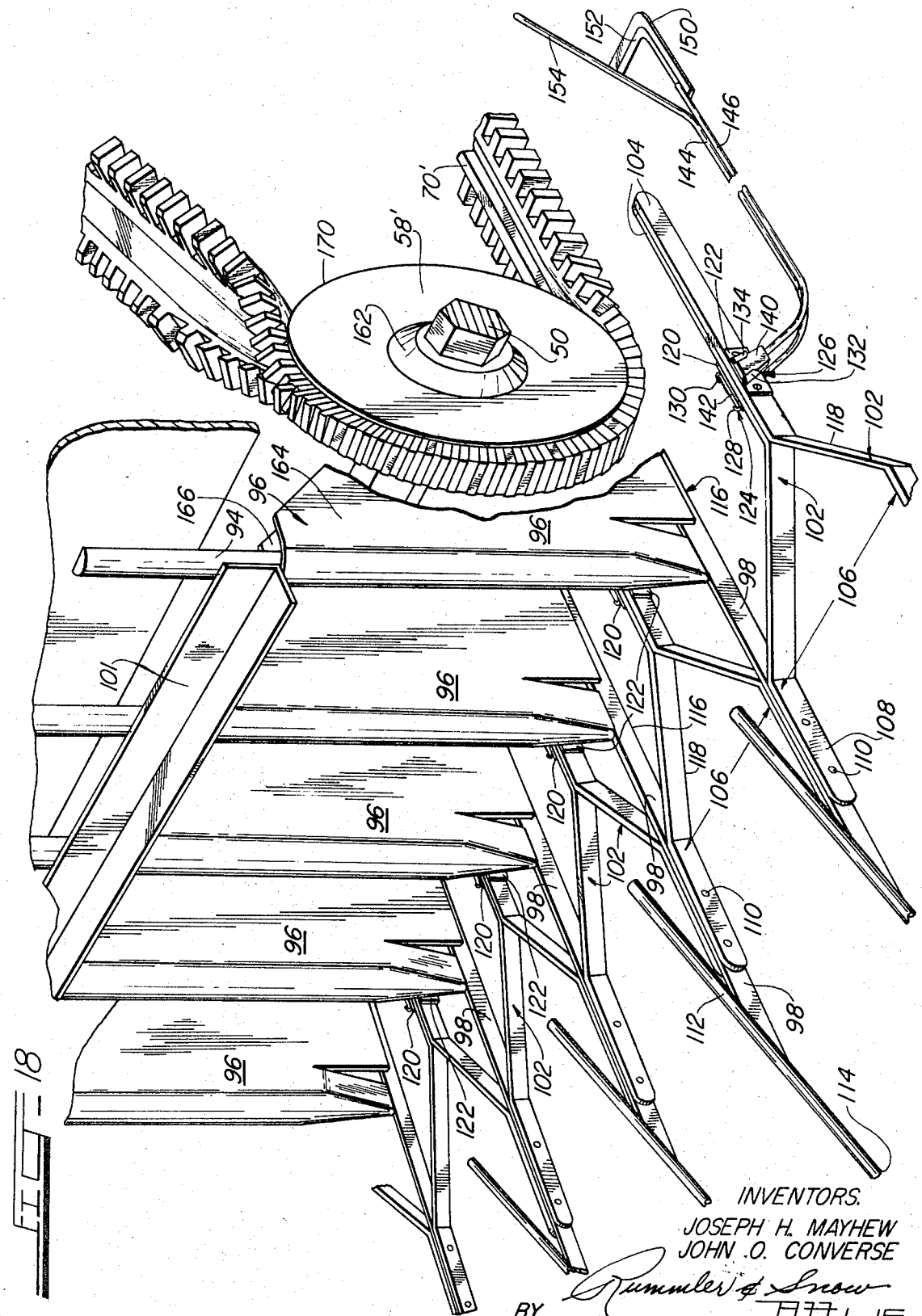

United States Patent Office 3,529,714
Patented Sept. 22, 1970

3,529,714
CONVEYOR BELT AND MACHINE EMPLOYING
SAME
Joseph H. Mayhew, Excelsior, and John O. Converse,
Minnneapolis, Minn., assignors to Hart-Carter Company, Chicago, Ill., a corporation of Delaware
Filed Oct. 6, 1967, Ser. No. 673,316
Int. Cl. A01d 45/00; B65g 15/14
U.S. Cl. 198—165
16 Claims

ABSTRACT OF THE DISCLOSURE

The disclosure describes a folding conveyor belt adapted for use with a flanged pulley, the belt having outwardly extending resilient means such as an offset siped flange, spaced teeth or digital members which are progressively folded, closed or interdigitated as the belt passes between the flanges onto the pulley and are progressively unfolded, opened or extended as the belt passes from the pulley. By providing remotely spaced pairs of pulleys carrying parallel sections of the folding belts in the same direction with their outwardly extending resilient means opposed in coplanar contiguous or spaced relationship, the progressively unfolding resilient means are adapted to engage an object therebetween and the progressively folding resilient means are adapted to disengage the object. In one embodiment a plurality of pairs of the folding conveyor belts is used in an above-ground harvesting machine further characterized by self-cleaning belts and pulleys, improved form of dragging counter-weighted knives and additional features such as a pivoted guide and selector assembly and improved bayonet mounting for the knife assembly. Other embodiments are disclosed.

BACKGROUND OF THE INVENTION

The present invention concerns certain improvements in conveyor systems for material handling apparatus wherein there is provided a folding conveyor belt adapted to operate in parallel relationship to grasp and move an object upon which work is to be done, flanged pulleys adapted to cooperate with the belts in the performance of the conveying operations with reduced friction and an improved form of knife mounting with cooperating elements adapted to perform certain harvesting operations. Also, the invention concerns a harvesting machine embodying these improvements.

Ordinary flat conveyor belts depending on gravity to hold objects thereon are well known. Many different forms of conveyors can be used to graps or retain objects of uniform size or weight which are not readily subject to breakage as illustrated by chain, link or cleated conveyors for cans, bottles, boxes, etc., in the packaging industry. One of the problems in material handling apparatus is to provide a simple, easily operated conveyor system which will selectively engage an object from a stationary or relatively moving platform, hold it for the performance of one or more mechanical operations and deposit or release it at a desired point. This problem is particularly acut where the object being treated is of a fragile nature, of irregular shape, and heterogeneous in size and weight.

Another problem arises when the material handling apparatus is operated continuously over long periods of time or used primarily out of doors and is subjected to the elements, dust, and vibration or is of the type using continuously moving belts or resilient members which are folded or spread by means of rollers or spring contact members. It is difficult to maintain the moving and interengaging conveyor parts in proper adjustment because of the severe wear to which the rubbing and rolling elements are subjected. Abrasive wear between the resilient members designed to interengage about the object to be moved soon causes the malfunction of this type of machinery and is accentuated where the proper functioning of a moving part is dependent on belt tension or clearance between the interengaging parts. Any folding, twisting or direction changes of belts, resilient fingers or interdigitating parts is a source of extreme wear and future malfunction. As a result, there are many mechanical operations or functions of machines which must be performed by hand or assisted by an operator. This invention concerns the provision of a folding belt and cooperating pulleys or sheaves which have a positive non-slipping drive action as well as providing yielding edges which operate in a parallel relationship to engage an object from the side, hold and convey it in proper orientation and release it, still properly oriented, at a desired point.

The invention has particular application in crop harvesting devices, that are moved along the earth's surface and subjected to adverse conditions of operation requiring positive conveyor action, ease of adjustment and repair, long service life and the ability to handle the crop with a minimum of waste or destruction. Since such machines must operate over uneven terrain, in dust and adverse weather conditions, any moving parts must be capable of withstanding severe wear and have built-in tolerances and flexibility of functions to give satisfactory performance. The problem is particularly acute in machines such as asparagus harvesters where the crop grows in a heterogeneous manner with the asparagus spears appearing in various lengths and sizes, even at maturity, and must be selectively cut and carefully conveyed to a hopper or container for the crop. This crop is easily damaged because the spears are somewhat brittle and grow close together so that there is little space in which to move the cutter and the spears are preferably supported at the moment of cutting to prevent loss. Furthermore, the spears must be cut at or below ground level and only those spears of specified heights are harvested, at any given pass over the asparagus bed.

U.S. Pat. 3,176,456 is directed to an asparagus harvester. A cutter is disclosed in the form of a cutting wire held between two pivotally mounted arms which are moved downwardly at the base and on each side of an asparagus spear by a sensing device or feeler. In copending application, Ser. No. 531,702, filed Mar. 4, 1966, there is shown a cutting device (a trailing snare) which drage on the ground, pulled along by a pair of parallel coil springs or cables which are held together at a point just behind their leading ends by elongated spring arms. The leading ends are spread apart between spaced guides through which the asparagus spears pass, and held at a predetermined height from the ground. By these means only those spears of a certain height pass between the V-shaped opening between the coil springs and into the path of the knife edge.

Cutters of this type disclosed in said patent operate satisfactorily but are subject to certain drawbacks in that the parallel arms often strike directly upon an asparagus spear and it is broken off and not harvested. No provision is made for easy removal or replacement of the prior art cutting devices. The trailing snare type cutter of said copending application gives much more satisfactory selective cutting and is the type of cutter contemplated for use in combination with the pivoted selector guide and selector assembly and the conveyor system of this invention in such a harvesting machine. Other known types of cutters can be used with the conveyor system, guide and selector assembly of thi sinvention to harvest other crops.

The conveyor device of the cited patent comprises a plurality coaxial rotors having radial resilient opposed fingers on the circumference of each. The fingers are spread by passage over and on each side of a series of stationary rollers to open same and receive the head of a spear of predetermined height; and closed thereon as they pass the last roller. The frictional engagement of the rollers with the fingers may be a source of severe wear of these parts resulting in malfunction of the gripping action in time. The conveyor of the cited copending application comprises a plurality of pairs of conveyor belts having sponge rubber flanges. The flanges of the belts run in parallel contiguous relationship and depend on the stiffness of the asparagus spear to be engaged therebetween. The breakage of asparagus spears can be high in both of these types of conveyors.

The instant invention, overcomes these and other difficulties in the prior art harvesting and conveyor systems by providing an improved mounting means for easy removal of the cutting knife, and improved conveyor belt with cooperating pulleys adapted to function therewith, and spear selector means having improved action. The device of this invention also prevents breakage of delicate crops and more positive conveyance and orientation of fragile items. Also, the parts are arranged in a manner to be readily accessible and adapted to rugged usage without malfunction.

SUMMARY OF THE INVENTION

The present invention concerns several embodiments and improvements in a conveying system and in an asparagus harvesting machine in particular. This invention provides a conveyor belt which has a side flange that folds inwardly upon passage over a flanged pulley. The shape of the belt flange and the pulley flange is such that by operating the belts in a side-by-side relationship a unique object-grasping, conveying, and releasing action is obtained which prevents breakage of fragile objects being processed while at the same time providing a firm holding action and assurance against loss, crushing or undesired misalignment of the attitude of the object. The invention also provides a self-cleaning conveyor system which is operable in a narrow space whereby a plurality of items can be picked up from a bed or platform on which the items are scattered in a heterogeneous manner. The device of this invention is also characterized by the provision of a double conveyor belt having opposed resilient flanges with lateral fingers extending from a pliant base member with a V-belt core, which fingers in an unfolded position are adapted to hold an object therebetween against dislodgement, especially an elongated or round object and which fingers in a folded position, while upon a pulley occupy a reduced space and are separated in a manner to selectively release the obect. Double flanged belts are provided in which the fingers on one side are interspaced between those of the opposite side and are spread and closed by the action of the pulley flange in such a manner as to smoothly and evenly interdigitate to a compact form. The reversal of this action takes place as the double flanged belt leaves the pulley flanges.

Accordingly, it becomes a primary object of this invention to provide an improved conveyor belt having a single or double resilient flange adapted to operate with a single or double contoured flanged pulley, in pairs, such that there is provided a zone of converging spaced or contiguous surfaces or fingers to engage an object, forming a zone of parallel running spaced or contiguous frictional surfaces or fingers to hold and convey an object, and terminating in a zone of diverging surfaces or fingers which disengage an object, all functioning in close and confined substantially parallel, or closely contiguous relationship across an area or platform from which said objects are to be picked up and worked upon. Another object of this invention is to provide in a harvester machine a unique mounting for a dragging snare cutter blade and manner of orienting same whereby more positive selection and cutting of selected crop plants is accomplished. These and other objects of this invention will be described or become apparent as this specification proceeds.

During the development of the conveyor belt of this invention it was found that a belt formed by fabricating soft rubber or sponge rubber flanges on a V-belt base would not fold upon itself in a smooth manner, tended to run off the pulleys, rub and vibrate against the flange surfaces and did not give a proper gripping action once unfolded. Also, belts formed with overlapping L-shaped flanges did not fold properly between the flanges of a pulley, rubbed against the flange surfaces in an erratic manner and were ineffective in holding elongated or round objects under the conditions of vibration generally found in machinery, especially harvesting machinery.

The discovery was made that a smooth folding action, with no vibration or rubbing, with or without interdigitation was obtained when the flanges were serrated, had spaced fingers, slits or sipes and that this construction allowed the flanges to fold toward each other without riding up on the pulleys and without binding or mis-matched engagement. In this modified belt structure, the bending of that portion of the belt just before it is fully engaged between the pulley flanges opens the spaces between the digits or fingers to allow easy entry and interdigitation of the opposing digits or fingers of the opposite flange as will be demonstrated herein. Provision of a pliant base between the V-belt core and the outer flange of the belt was found to supplement the foregoing improved functions. Both the folding belts and the pulleys were found to be self-cleaning. Furthermore, in the art of harvesting heterogeneous crop plants using a trailing snare cutter, it was found that by suspending the flexible cables of the snare cutter at their forward ends from a pair of elongated, thin flat vertically positioned, horizontally extending, contiguous spring members, having forward surfaces converging at or near the points of suspension of the cables, a vastly improved plant selector means was formed, particularly as applied to the harvesting of tender, frangible plants such as asparagus spears.

DESCRIPTION OF THE DRAWINGS

The specific embodiment of the invention is shown and illustrated in the accompanying drawings in which:

FIG. 1 is a side plan view of an asparagus harvester with one form of conveyor and plant selector means of this invention;

FIG. 2 is a top sectional view of the embodiment shown in FIG. 1 taken along lines 2—2 therein except the prime mover has been omitted;

FIG. 3 is a partial sectional view taken along the lines 3—3 of FIG. 1 showing part of the parallel conveyor belts in relation to coaxial flanged pulleys and coaxial non-flanged idler pulleys;

FIG. 4 is a partial view in perspective showing the engagement of a conveyor belt with one of its cooperating flanged pulleys;

FIG. 5 is a partial view in cross-section of the cooperating parallel belts also showing the manner of engagement with the idler pulleys at the central V-belt core;

FIG. 6 is a fragmentary cross-sectional view taken along lines 6—6 of FIG. 4 to show the pulley flange construction and the manner in which the flanges fold the belt upon itself;

FIG. 7 is a fragmentary top plan view of one form of a conveyor belt;

FIG. 8 is a fragmentary plan view to show the interlocking position taken by the conveyor belt as it passes around a flanged pulley;

FIG. 9 is a cross-sectional view taken along lines 9—9 of FIG. 4 to show the relationship of the side flanges under the force of gravity in those sections of the belt between an idler pulley and a flanged pulley;

FIG. 10 is a fragmentary end view, in cross-section, of another form of conveyor belt of this invention;

FIG. 11 is a cross-sectional view to show the interengagement of a pair of belts such as shown in FIG. 10 with an asparagus spear;

FIG. 12 is fragmentary cross-sectional view of the conveyor belt of FIGS. 10 and 11 as same partially engaged upon a flanged pulley;

FIG. 13 is a partial sectional view taken along lines 13—13 of FIG. 1 showing the relationship of the pulley hubs, the selectors and guides and the snare cutters;

FIG. 14 is a top plan view, partially cut away, of a snare cutter in unmounted condition;

FIG. 15 is a side plan view, partially cut away, of a snare cutter shown in FIG. 14;

FIG. 16 is an enlarged view of the belts shown in FIG. 3 showing their engagement with an asparagus spear;

FIG. 17 is a side plan view, partially cut away, of the bayonet mounting for a snare cutter;

FIG. 18 is a front perspective view partially cut away to show the guide and selective cutter arrangement of this invention; and FIG. 19 is a diagrammatic view of the selective cutting action of the embodiment shown in FIG. 18.

In these various views similar reference numbers are used with corresponding parts.

THE PREFERRED EMBODIMENT

Referring to the drawings, particularly FIGS. 1, 2 and 13, the preferred embodiment of this invention is illustrated by means of an asparagus harvester having a supporting frame comprising longitudinal side members 10 and 12 with rear cross member 14, forward yoke members 16 and 18 having hitch 20 attachable to the draw bar 22 of prime mover or tractor 24. The frame has supporting wheels 26 carried by an axle 28. Front and rear upright members 30 and 32, with side members 34 and with top members 36 complete the frame or enclosure for the device. If desired side panels (not shown) may be used to form a complete enclosure for the working parts.

A suitable arrangement of upright members 38 and 40 with diagonal members 42 and cross braces 44 from an internal framework supporting a drive shaft 46, a line shaft 78, forward shaft 50 and idler shaft 52, which rotatably support, respectively, a series of transversely spaced drive pulleys 54, swingable arms 72 each supporting an idler pulley 56, forward pulleys 58 and follower or idler pulleys 60. A drive sprocket 62 and a driven sprocket 64 with interconnecting driven chain 66 forms the motive power by which the series of belts 70 are rotated therearound. The various shafts or axles 46, 50 and 52 preferably are affixed to the series of pulleys therealong as by means of a key (not shown) or by using a square or hexagon shaft upon which the hubs of the pulleys engage so as to rotate in unison as will be described.

As shown the idler pulleys 56 are made adjustable vertically, and are individually mounted rotatably respective pivot arms 72, which, in turn, are mounted on the line shaft 78 which extends between the frame members 44, each pivot arm being held individually by a respective one of a series of adjusting linkages 76. The linkages 76 are pivoted to the pivot arms 72 as at the pin 74 and have adjusting means, e.g., the journalled bolts 80 carried by the cross member 82 attaching between the frame members 40 and 42. By these means each of the idler pulleys 56 can constantly be urged upwardly to individually adjust and maintain the tension on the belts 70. With the drive arrangement shown, the prime mover 24 pulls the harvester in the direction of the arrow (to the right) causing the trailer wheels 26 to rotate clockwise and to drive the shaft 46 and pulleys 54 in clockwise rotation. In one embodiment, the relative size of the drive sprockets 62 and 64 is made such that a 1:1 ratio of wheel travel to belt travel is maintained. The belts 70 are thus driven so that their bottom run, between the pulleys 58 and 60, moves in a direction opposite the direction of harvester travel but at the same speed as the harvester and there is no relative movement between the rearwardly moving belt sections and the ground 84.

In the forward end of the harvester frame a pair of vertical supports 86 are provided to which is affixed the horizontal pivot shaft 88. At least a pair of brackets 90 are rotatably supported along the shaft 88 to which are attached the anchor frame plate 92 which has an L-shaped cross-section. The downwardly extending section of the plate 92, has affixed therealong a series of vertical spaced half-round bars 94 (see also FIG. 18) carrying spaced divider plates 96 defining passageways therebetween and having affixed to the ends, divider arms 98 defining therebetween forward passageways through which pass the asparagus spears 100 as the harvester is pulled over the ground or asparagus bed 84. Cross brace 101 provides lateral rigidity.

Referring particularly to FIG. 18, affixed to each divider arm 98 is a pair of thin, resilient divider springs 102 having trailing resilient contiguous spring arms 104 which are outwardly spaced from the immediate divider plate 96, held by the same divider arm, to define therebetween a divider section. Between each divider section there is a narrow passageway 106. The leading ends 108 of the divider springs 102 are affixed to the supporting divider arm 98, as by rivets 110. The extended forward end of each divider arm 98 carries, welded, or otherwise affixed thereto, a probe 112 having a rounded point 114. The probes 112 are carried at a downwardly and forwardly projecting position so that the tips 114 will pass between and adjacent the bases of the asparagus spears whereby the sloping probes, as they are moved along above the ground, will gradually separate and straighten any overlapping or crooked spears for entrance into an appropriate one of the contiguous passageways 106.

The divider arms 98 and the spring arms 102 along the assembly are mounted in a coplanar relationship and their bottom edges 116 and 118 are at the height above the ground of those asparagus spears which are too short and thus not to be harvested. All spears having heights greater than the height of edges 116 and 118 will pass into the passageway 106 between the divider springs 102 of adjacent divider arms 98.

The contiguous, opposed spring arms 104 of the adjacent divider springs are flat, thin, very flexible and elongated so as to be readily spread apart by an asparagus spear or moved from side-to-side by any asparagus spears which enter the opening 106 at the level of the divider arms 98. The inner contiguous surfaces of the spring arms 104 are smooth as are the inner surfaces of the divider spring portions 102, to allow a minimum of friction contact with the asparagus spears.

A pair of anchor plates 120 and 122 is mounted at substantially opposite positions on the outside of each pair of contiguous spring arms 104, by means of rivets 124. The anchor plates carry bayonet anchors 124 and 126, respectively, having inwardly directed opposite flanges 128–130 and 132–134. These flanges are spaced outwardly from the body of the bayonet anchors 124 and 126 sufficiently to enage the bayonet or dove-tail mounting plates 140 and 142 to which are affixed the elongated flexible cables 146 and 144, respectively.

The trailing ends of the cables 144 and 146 carry thereacross the cutter blade 150 having an L-shaped forwardly directed cutting edge 152. One or both of the cables 144 and 146 may have an extension 154 to act as a weight to hold the cutter to the ground. This cutter unit is shown in more detail in FIGS. 14 and 15 and except for the bayonet mounting means and the counter-weight 154, is substantially the same as that disclosed in said copending application.

FIG. 17 shows in greater detail the relationship of the parts of the bayonet mounting means and the upwardly diverging relationship of the flanges 132 and 134 cooperating with the flat dove-tail shaped mounting plate 140 so that the cable 146 can be readily attached or detached from the spring arm 104. The anchor plate 122 is the mirror image of anchor plate 120 which mounts the cable 144 companion to the cable 146.

FIG. 19 illustrates the manner of operation of the divider springs 102 and the spring arms 104 as they function to harvest only those asparagus spears of proper size. An asparagus spear 100, offset from the centerline of the opening 106, is shown to have been engaged by the divider spring 102″ which is thereby deflected counterclockwise to pass around the spear as the selector assembly moves forward relative to the spear. This action has caused the divider spring 102′ to swing counter-clockwise from its normal central position 160 to follow the divider spring 102″ to bear against the asparagus spear 100 and at the same time swing the cutter cable 146 forward the companion cable 144. This causes the cables 144 and 146 to receive the asparagus spear 100 between them and to be guided thereby to lead the trailing knife 150 to cut the spear at its base. The smaller and shorter spear 100′ has passed under the divider arms 102′ and 102″ and since it does not engage them to open the cables 144–146 it cannot enter between the said cables. The cables, however, are so flexible as to readily weave or snake around and between any spears which do not enter between them. As shown in FIG. 19 the spear 100″ is already engaged between the trailing cables 144 and 146 and is at the point of machine travel where it is being gripped on opposite sides by the belt pairs 70 and 70′, just prior to passing against the knife 150. The counter weight on the knife has been omitted in FIG. 19 for simplicity of illustration.

FIG. 1 shows the relationship of the forward flanged pulleys 58 extending within the shield 96 which places the belts 70 in a position to engage those asparagus spears which pass between the divider arms 102, as shown in FIG. 19. This is also shown in FIG. 18 by the pulley 58′, on the hexagonal shaft 50, placed directly behind the shield 96 and between the spaced plates 164 and 166 thereof. Each of the flanged pulleys 58 on the line shaft 50 are similarly located behind their respective shields 96, only one such pulley being illustrated in FIG. 18.

Referring to FIG. 3 the hexagon shaft 50 is shown supporting a series of coaxial flanged pulleys 58 with their hubs 162 in contact one to the other to act as pulley spacers whereby these pulleys will carry the belts 70 in substantially parallel relationship to the idler pulleys 60 which are spaced apart axially in the same way on the line shaft 52. The pulleys 58 have spaced circumferential flanges 170 which engages the belts in a folding action to be described in the form shown. Each belt has a central V-belt core 172 which has longitudinal internal reinforcing cords or wires as indicated in FIG. 9. The idler pulleys 60 have spacer hubs 174 and are essentially the same size and width as the flanged pulleys 58 except for the reduced size of the flanges 176 thereon which engage only the V-belt cores 172 (FIG. 5). Each pulley pair is spaced apart by the pulley hubs, as indicated at 180 in FIG. 5, to allow the passage of asparagus spears 100 between the pulleys without being broken. The pulleys 58 are made of plastic or metal, have integral hubs and, as shown in FIG. 6, are formed in two identical half-sections joined at the center line 182.

Referring to FIGS. 4 and 5 it is seen that the belts 70 each have a resilient base 184 extending from each side of the core 172 and outer flanges 186 having a plurality of teeth or fingers 190 therealong with interposed notches or spaces 192 defining flat outer engaging surfaces 194. The flanges 186 have beveled inner surfaces 196 extending out to the cut-off point 198. The teeth or fingers 190 on one side of a belt 70 are offset from those on the other side or opposed to the spaces 192 on the other side as shown in FIG. 7 and the width of the teeth or fingers 190 is the same as or less than the width of the spaces 192 so that as the belt travels around a flanged pulley 58 the points 198 will fold into the opposed spaces 192 in the manner shown in FIG. 6, by the sliding action of the flanges 170. Both halves of the belt are forced inwardly upon each other and flex along the resilient base 184. The points 198 overlap as shown in FIG. 6. FIG. 8 is a plan view of a belt 70 in this folded relationship shown in FIG. 6.

The flanged pulleys 58 on the line shaft 50 in FIG. 2 are twelve in number, for purposes of illustration in a harvesting machine. There are eleven spaces 106 into which asparagus spears of the selected height pass to be cut by the knives 150 and each such space has a pair of co-acting belts 70–70′ (as shown in FIGS. 18 and 19) with their flanges 186 converging or unfolding outwardly as they are released by the flanges 170 of the pulleys 58 on the shaft 50. This brings the fingers 190 and 190′ in parallel coplanar relationship upon opposite sides of any asparagus spears of the predetermined height. The surfaces 194 engage the sides of the asparagus spear and flex or slide over the asparagus spear as shown in FIG. 16. to hold the spear in oriented position as the cutter knife 150 severs it adjacent ground level.

The belts 70 continue around the idler pulleys 60, with the asparagus spears being carried through the spaces 180 between the idler pulleys 60, upwardly to the drive pulleys 54. The drive pulleys 54, like pulleys 58, have flanges 170 and fold each belt upon itself in like manner as shown in FIGS. 4 and 6. At this point the fingers 190 and 190′ (FIG. 16) are diverging or folding away from one another and the asparagus spears are dropped in the hopper 200. Since the bottom end of each asparagus spear is heavier than the tip, and the spears are all released at the same angle by the belts 70, they tend to fall into the hopper 200 in a generally oriented fashion for ease in subsequent removal and processing. The fingers 190 and 190′ of the opposed belts can be contiguous or a space 202, smaller than the thickness of the object to be carried, can be provided between the fingers during their travel between the pulleys. This space 202 can be adjusted to accommodate different size objects.

Referring to FIG. 9 another embodiment of a belt 70 is shown wherein the object engaging surfaces 194 of the fingers 190 are angularly offset toward the cut-off points 198. Because of the resilience of the base 184, the engaging surface 194 will orient along a substantially vertical line A–B under the force of gravity as the belts pass between the pulleys 58 and 60. This offset of the surfaces 194 counteracts the sag in the belts between the pulleys of the conveyor system and is particularly adapted to the provision of substantially coplanar or spaced parallel engaging surfaces for cylindrical objects which are to be held vertically.

The instant invention relates to the other forms of belts shown in FIGS. 10, 11 and 12, which have a different folding action than that shown in FIG. 6. The modified belt 170 in FIG. 10 has a resilient base 204 on one side of the V-belt core 172 which is slightly shorter than the opposite base 206. The outer edges of both bases have an angular depending flange 208 of equal depth which has a plurality of closely spaced sipes 210 extending through the flanges from the edge 212 to the center part 214 of the bases 204. The siped edges of parallel belts are compressed upon each other along the length of the belts in an object-gripping manner as shown in FIG. 10. The bases 204 and 206 of the opposed belts flex as shown in FIG. 11 when engaged upon an asparagus spear 100. The sipes may be coplanar across the belt 70′ or offset, as desired.

In the embodiment shown in FIG. 12, the sipes 210 extend through the flanges 220 and 222, only as far as the juncture with the bases 224 and 226. In this modified structure of belt 70″, the base of the V-belt 172 joins the bases 224 and 226 in a narrow resilient joint 228 on each side to provide easy folding action. The base 224 and 226 are of unequal length. The modified belt shown in FIGS. 10 and 11 folds upon itself, on passing around a flanged pulley, in the same manner as that shown in FIG. 12.

The belt 70″ in FIG. 12 is shown without the pulley flanges and the degree of folding shown is adequate for most purposes, although preferably the siped flanges 220 and 222 are brought to full overlapping position in order to provide maximum space between this belt and its cooperating belts, on each side, to encompass an object to be engaged.

From the foregoing description it is apparent that a number of modifications and uses can be made in and of the conveyor, selector and cutter arrangements of this invention. It is obvious that a pair of belts 70, each having a single serrated flanged edge, running in substantially parallel opposed positions from pulleys having only one flange 170, but with provision to engage the V-belt core 172', can be used to form a simple conveyor system. The spaces 192 between the teeth 190 of the belt shown in FIGS. 4, 5 and 6 need only be slightly wider than the teeth to accomplish the folding action illustrated. As the belt passes onto or from the flanged pulley, there is a continuous bending and opening of the spaces 192 as shown at 192', whereby the opposite incoming or outgoing tooth 190' is received or released, as the case may be with little or no rubbing, vibration or misalignment.

The teeth 190 may have truncated points 198 as shown in FIG. 5 to provide squared tips which are less resilient and not liable to be deformed by centrifugal action as they begin to pass onto a pulley. Each tooth 190 can be made to conform with the space 192 on the opposite side of the belt or foreshortened as shown in FIG. 6 to provide a space between the tips 198 and the opposite flange. If desired a flash, not shown, can be provided along the pulley engaging surface of the belts extending outward to the plane of the teeth edges 194. The two halves of the pulleys 58 and 60 can be joined at their junctures 182 by means of a solvent adhesive or adhesive composition adapted to firmly affix these parts together. Heat sealing may also be used depending on the type of plastic used to form these parts. The pulleys can be made of any thermoplastic or thermosetting resin having sufficient rigidity and strength for the intended purpose. The pulleys can be molded and machined or polished to provide smooth engaging flanges.

As used in a harvesting machine the self-cleaning action of the pulleys and belts is such that the shields 96 can be eliminated or formed with side plates 164 and 166 of lesser dimensions. A feature of this invention is the provision of a selector and divider unit for use in a harvesting machine which is one piece to include a divider arm 98, a probe 112, with a pair of divider springs 102 and the bar 94 with attached divider plate 96. This combination of elements can be formed as a unit of metal or plastic and affixed to the plate 92 by any suitable means.

In order to provide additional rigidity to the assembled structure the cross member 101 can be placed at a lower position than that shown in FIG. 18. Provision can also be made to hold the divider assembly in its pivoted or raised position while the cutters 150 and other parts are being inspected.

The belts 70 which occupy the outside positions can be single flanged, since the outer flanges of a double flanged belt in these positions would be non-functional. Such a single-flanged belt with a V-belt core can be run on double or single flanged pulleys.

Also, the surfaces 194 or the inner surfaces of the teeth 190 can be cross-siped, beveled or otherwise shaped to accommodate any desired gripping action or particular shaped object to be engaged and conveyed.

The conveyor system of this invention can be adapted for use in cooperation with various forms of automatic or hand-operated machinery, whether stationary or propelled by a prime mover. The means to rotate the drive pulleys can be any form of motive power and, if desired, the various sets or pairs of pulleys can be individually mounted for separate rotation at different speeds and different directions to provide combinations of zones of parallel object-engaging, object-conveying and object-releasing functions. Also, the length of the belt is subject to variation to accommodate the conveyor problem at hand. By using a number of idler pulleys 60 in series, and properly spaced, any desired length of conveyor system can be fabricated.

Having thus described the invention the only limitations attaching thereto appear in the appended claims.

What is claimed is:

1. A folding belt apparatus comprising
    (a) a pulley and a continuous loop adapted to be engaged by and pass over the pulley,
    (b) resilient fingers extending transversely and in a common plane along each of opposite sides of said belt, and
    (c) flange means on said pulley for progressively folding said fingers outwardly from said plane in the radial direction as said belt passes onto the pulley, said fingers progressively unfolding and resiliently returning to said common plane as said belt passes from said pulley.

2. A folding belt apparatus in accordance with claim 1 in which:
    (a) said flange means comprises a pair of axially spaced radial flanges and the pulley has an annular flat sided groove between said flanges,
    (b) said belt has a continuous V-belt core seated in the groove of said pulley and a resilient base extending laterally from the outer face of said core on each side thereof,
    (c) said fingers extend from said resilient base along opposite edges thereof, and
    (d) said fingers fold outwardly of said plane and toward each other by flexing of the said resilient base during engagement of the fingers with said pulley flanges.

3. Apparatus in accordance with claim 2 including
    (a) a pair of said continuous belts carried by axially spaced first and second pairs of radially flanged pulleys with the respective fingers of the two belts normally in opposed closely spaced coplanar position,
    (b) and means to rotate said pulleys whereby the fingers of said belts are progressively folded to an unopposed position by the flanges of the first pair of pulleys upon engagement therewith, resiliently unfolded from the said flanges upon leaving the first pair of pulleys, and then progressively folded by the flanges of the second pair of said pulleys to dispose the fingers of said belts in the unopposed position.

4. A folding belt apparatus in accordance with claim 1 in which:
    (a) said belt includes a continuous V-belt core,
    (b) a resilient base member extends laterally outward from each side of the outer faace of said V-belt core, and
    (c) the resilient fingers extend laterally outward from each edge of said base member in uniformly spaced relation therealong and are adapted to be folded outwardly from said core by flexing of the base member between said fingers and the core upon engagement of the fingers with the flange means of said pulley.

5. A folding belt apparatus in accordance with claim 4 in which:
    (a) said pulley has a pair of axially spaced peripheral flanges between which said belt is engaged by the pulley, and
    (b) said resilient fingers are uniformly and longitudinally spaced along each edge of the base member with the fingers on one edge offset relative to those on the opposite edge whereby the fingers of the two edges will be folded into each other in intermeshed relationship by the flanges of said pulley.

6. A folding belt in accordance with claim 4 in which
    (a) said spaced fingers have substantially coplanar flat elongated outer end surfaces extending outwardly relative to the plane of said base member and
    (b) the fingers on one side are opposite the space between the fingers of the other side so that when folded away from said V-belt core in an arc of about 90° the fingers interdigitate with each other.

7. A folding belt in accordance with claim 6 in which
(a) said resilient base member extends from each side of said core and on one side of said core is sufficiently wider than on the other side of said core whereby the finger means extending from the wider base member overlaps the finger means on the other side when in said folded position.

8. A folding belt in accordance with claim 7 in which
(a) said resilient base member has a flexible flange extending along each outer margin and disposed normal thereto, each of said flanges having a series of closely spaced sipes therethrough extending to said base member.

9. A folding belt apparatus according to claim 6 wherein the said flat end surface of each finger defines the end of a tooth-like body extending from the plane of said base member, each finger being of uniform width from the base member to the said end surface.

10. A folding belt apparatus according to claim 9 wherein the inner surface of said body is beveled from the base member toward the said end surface to provide a generally triangular shape to the body.

11. A folding belt apparatus according to claim 10 wherein the said flat end surface is inclined laterally outward from the base member.

12. A folding belt apparatus according to claim 6 wherein the said flat end surface of each finger is inclined laterally outward from the plane of the base member and each finger is of uniform width from the base member to said end surface.

13. In a machine of the class described the combination of
(a) a first series of pulleys each having a pair of axially spaced radial flanges extending from the annular body thereof, said pulleys being mounted on a common axis,
(b) a second series of pulleys each having a pair of axially spaced radial flanges extending from the annular body thereof, said second series of pulleys being mounted on a common axis remote from and substantially coplanar with the axis of said first series of pulleys,
(c) the respective flanges and circumferential bodies of said pulleys of the first series being substantially opposite the respective flanges and circumferential bodies of corresponding ones of the pulleys of the second series,
(d) a series of continuous belts each having a central longitudinal core engaged by and extending between the bodies of respective opposite pairs of said pulleys,
(e) each of said belts having longitudinally spaced resilient means normally extending laterally from each side of the respective belt cores and the said resilient means of adjacent belts being in opposed substantially coplanar relationship between said pulleys,
(f) said belts being of greater width than the space between the pulley flanges and the resilient means on each of said belts being progressively folded in the radial direction relative to the axis of each of said pulleys upon engagement between the flanges thereof and progressively unfolded into their mutually opposed coplanar position by disengagement from said flanges of said pulleys.

14. A machine in accordance with claim 13 in which said pulleys are separable and have axially extending hubs which abut the hubs of adjacent pulleys to provide an annular space between the pulleys of a width at least equal to the sum of the distances that the resilient means of said belts extend laterally beyond the planes of the mutually facing flanges of adjacent coaxial pulleys.

15. A machine in accordance with claim 13 in which said pulleys comprise:
(a) a pair of identical disc members joined together along matching opposed surfaces,
(b) said disc members each having an integral hub, an annular body and a circumferential flange extending radially beyond said body on the side opposite said opposed surfaces.

16. A machine in accordance with claim 13 including:
(a) means for mounting said first and second series of pulleys in a fixed spacial relationship with the coplanar opposed resilient means of said belts disposed to travel in alignment with and past a continuous source of objects to be conveyed,
(b) means for rotating one of said series of pulleys whereby upon leaving the pulleys of the first series said progressively unfolding resilient means of adjacent pairs of belts engage opposite sides of successive ones of said objects and convey the same across the space between said pulley series and said progressively folding resilient means disengage said objects at the end of said space upon engaging the pulleys of the second series.

References Cited

UNITED STATES PATENTS 1,781,750    11/1930    Dodge _____ 198—190
3,304,704    2/1967    Lee _____ 198—179

RICHARD E. AEGERTER, Primary Examiner

U.S. Cl. X.R.

171—61; 56—327; 198—184